United States Patent
Stearns

(10) Patent No.: US 9,267,698 B2
(45) Date of Patent: Feb. 23, 2016

(54) MISTER FAN

(71) Applicant: Techtronic Power Tools Technology Limited, Tortola (VG)

(72) Inventor: Brian Stearns, Anderson, SC (US)

(73) Assignee: Techtronic Power Tools Technology Limited, Tortola (VG)

(*) Notice: Subject to any disclaimer, the term of this patent is extended or adjusted under 35 U.S.C. 154(b) by 176 days.

(21) Appl. No.: 14/192,966

(22) Filed: Feb. 28, 2014

(65) Prior Publication Data

US 2015/0247644 A1    Sep. 3, 2015

(51) Int. Cl.
| | |
|---|---|
| *B01F 3/04* | (2006.01) |
| *F24F 5/00* | (2006.01) |
| *F24F 6/14* | (2006.01) |
| *F24F 7/007* | (2006.01) |

(52) U.S. Cl.
CPC ............... *F24F 6/14* (2013.01); *B01F 3/04021* (2013.01); *B01F 3/04049* (2013.01); *F24F 5/0035* (2013.01); *F24F 7/007* (2013.01)

(58) Field of Classification Search
CPC . B01F 3/04021; B01F 3/04049; F24F 5/0035
USPC .......... 261/28, 30, 43, 67, 72.1, 90, 115, 116
See application file for complete search history.

(56) References Cited

U.S. PATENT DOCUMENTS

| | | | |
|---|---|---|---|
| 4,839,106 A | 6/1989 | Steiner | |
| 5,620,633 A | 4/1997 | Junkel et al. | |
| 6,237,896 B1 | 5/2001 | Hicks et al. | |
| 6,272,874 B1 | 8/2001 | Keeney | |
| 6,371,388 B2 | 4/2002 | Utter et al. | |
| D457,613 S | 5/2002 | Schaefer | |
| 6,786,701 B1* | 9/2004 | Huang | F04D 29/705 239/77 |
| 6,789,787 B2* | 9/2004 | Stutts | F24F 5/0035 261/28 |
| 7,395,676 B2 | 7/2008 | White | |
| 7,510,170 B2 | 3/2009 | Huang | |
| 8,016,270 B2 | 9/2011 | Chen et al. | |
| 8,496,232 B1* | 7/2013 | Nelson | F24F 5/0035 261/28 |

FOREIGN PATENT DOCUMENTS

EM    001935453-0003    10/2011

* cited by examiner

*Primary Examiner* — Robert A Hopkins
(74) *Attorney, Agent, or Firm* — Michael Best & Friedrich LLP

(57) ABSTRACT

A mister fan includes a base, a motor supported by the base, a blade assembly supported by the base and driven by the motor, a first conduit extending from the base and configured to receive liquid from a first fluid source, and a second conduit extending from the base and configured to receive liquid from a second fluid source that is different than the first fluid source. The mister fan also includes a spray nozzle unit supported by the base adjacent the blade assembly. The spray nozzle unit is in fluid communication with the first conduit and the second conduit to selectively receive liquid from the first and second conduits.

24 Claims, 6 Drawing Sheets

MISTER FAN

BACKGROUND

The present invention relates to personal misters, such as mister fans.

Personal misters provide a cooling mist to cool down an immediate environment. Many personal misters receive liquid from a water source and use a fan and misting nozzles to distribute the liquid as a cooling mist over an immediate area around the mister.

SUMMARY

In one embodiment, the invention provides a mister fan that includes a base, a motor supported by the base, and a blade assembly supported by the base and driven by the motor. The mister fan also includes a first conduit extending from the base and a second conduit extending from the base. The first conduit is configured to receive liquid from a first fluid source, and the second conduit is configured to receive liquid from a second fluid source that is different than the first fluid source. The mister fan further includes a spray nozzle unit supported by the base adjacent the blade assembly. The spray nozzle unit is in fluid communication with the first conduit and the second conduit to selectively receive liquid from the first and second conduits.

In another embodiment the invention provides a mister fan assembly including a bucket having a sidewall with an upper edge. The bucket defines a fluid reservoir. The mister fan assembly also includes a mister fan having a base coupled to the upper edge of the bucket to support the mister fan generally on top of the bucket, a pump supported by the base, a motor supported by the base, and a blade assembly supported by the base and driven by the motor. The mister fan also includes a first conduit extending from the base and a second conduit extending from the base. The first conduit is configured to receive liquid from a first fluid source, and the second conduit extends into the bucket to receive liquid from the fluid reservoir. The mister fan further includes a spray nozzle unit supported by the base adjacent the blade assembly. The spray nozzle unit is in fluid communication with the first conduit and the second conduit to selectively receive liquid from the first and second conduits.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
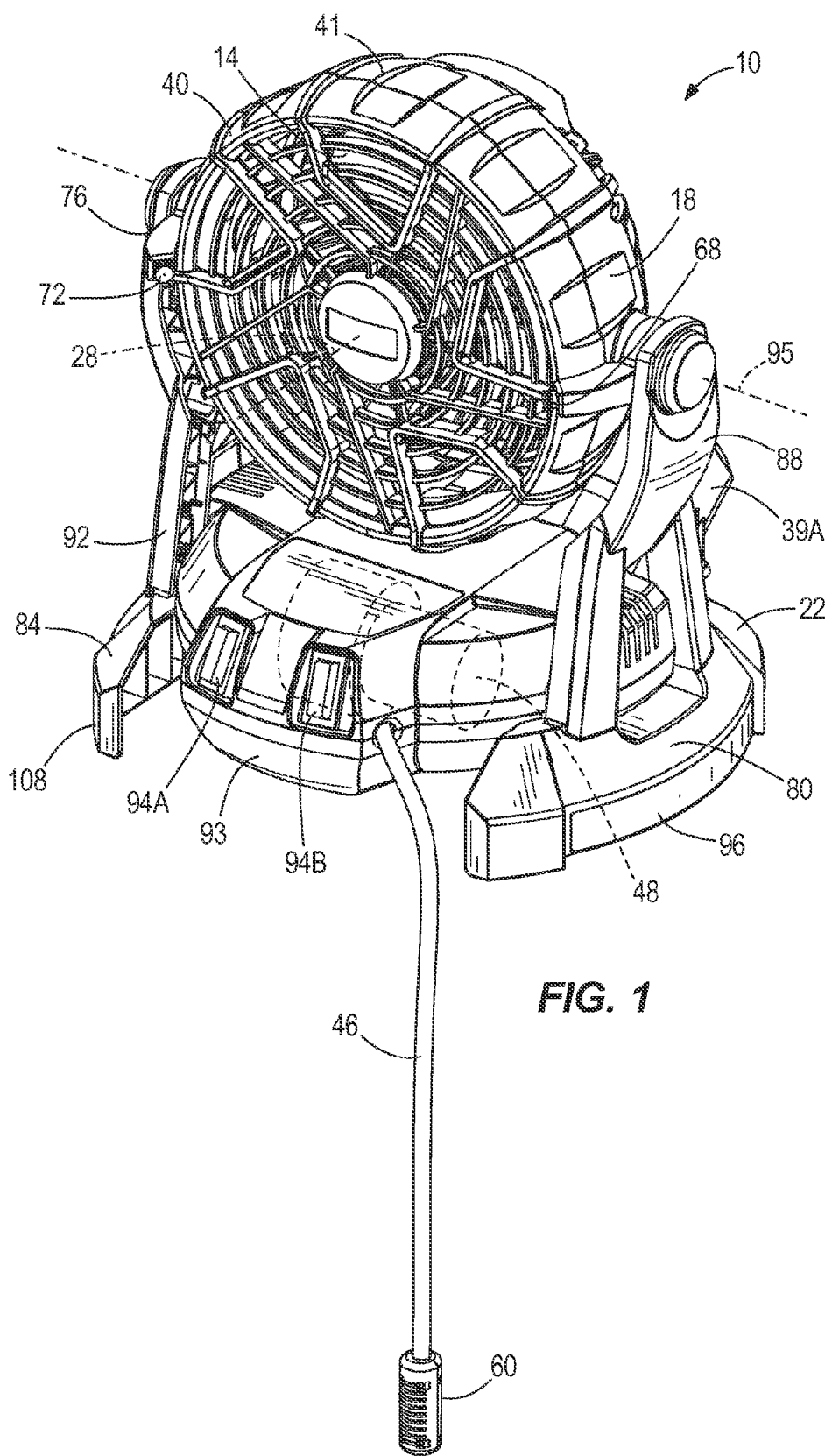
FIG. 1 is a top, front perspective view of a mister fan according to one embodiment of the invention.

FIG. 1 illustrates a mister fan 10 configured to receive liquid from two separate fluid sources (i.e., a first fluid source and a second fluid source). In the illustrated embodiment, the mister fan 10 can selectively receive liquid from both a fluid reservoir and a pressurized fluid source based on the resources available and the environment. For example, if the mister fan 10 is used at a place where a pressurized fluid source (e.g., a water or garden hose) is not available, the mister fan 10 may be coupled to a fluid reservoir (e.g., a bucket) and extract liquid (e.g., water) from the fluid reservoir. Alternatively, if the mister fan 10 is used in a location where a pressurized source of fluid is available, the mister fan 10 can be conveniently and cost effectively connected to the pressurized fluid source.

Figure 2:
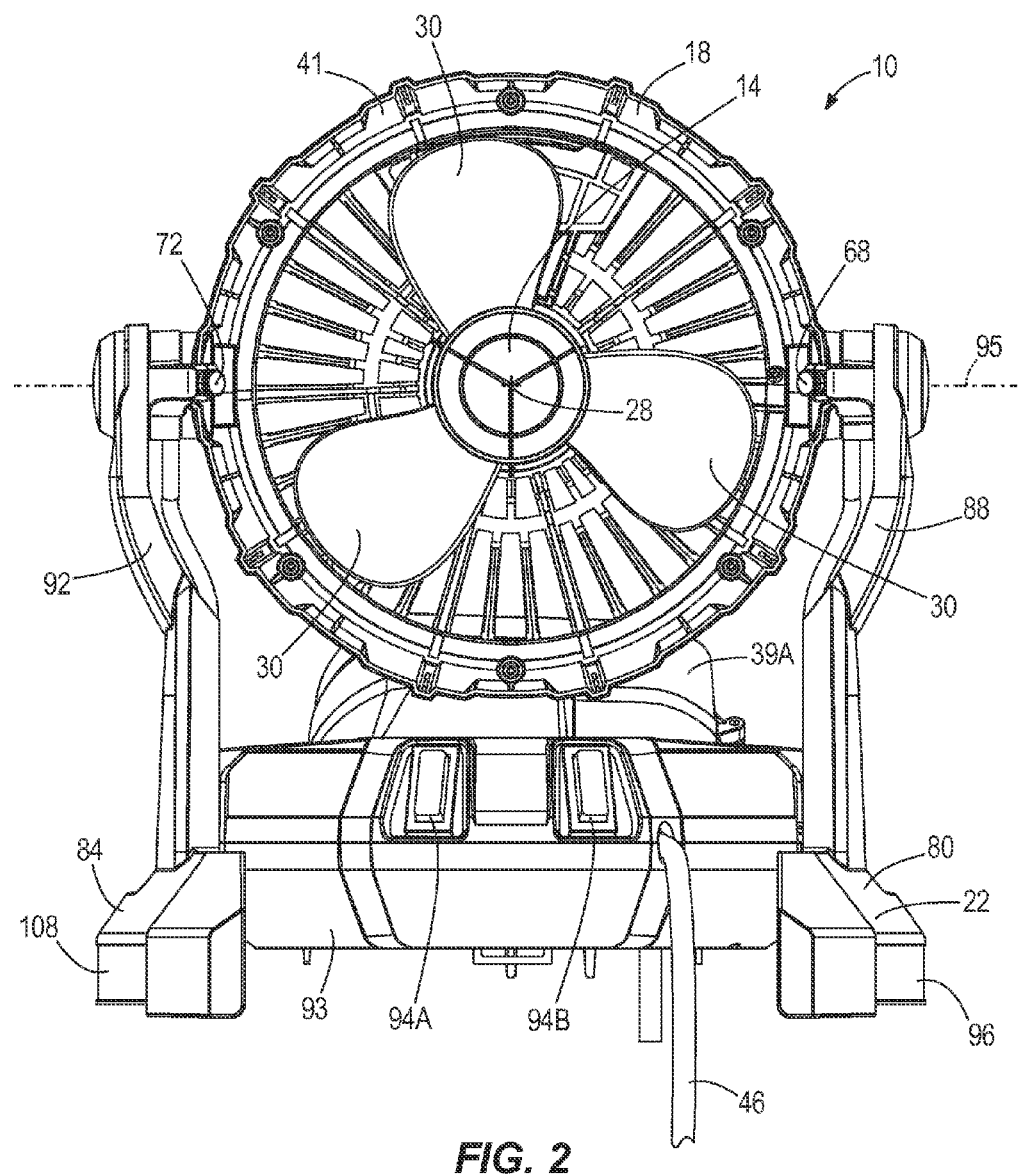
FIG. 2 is a front view of the mister fan with a front shroud portion removed from the mister fan.
Figure 4:
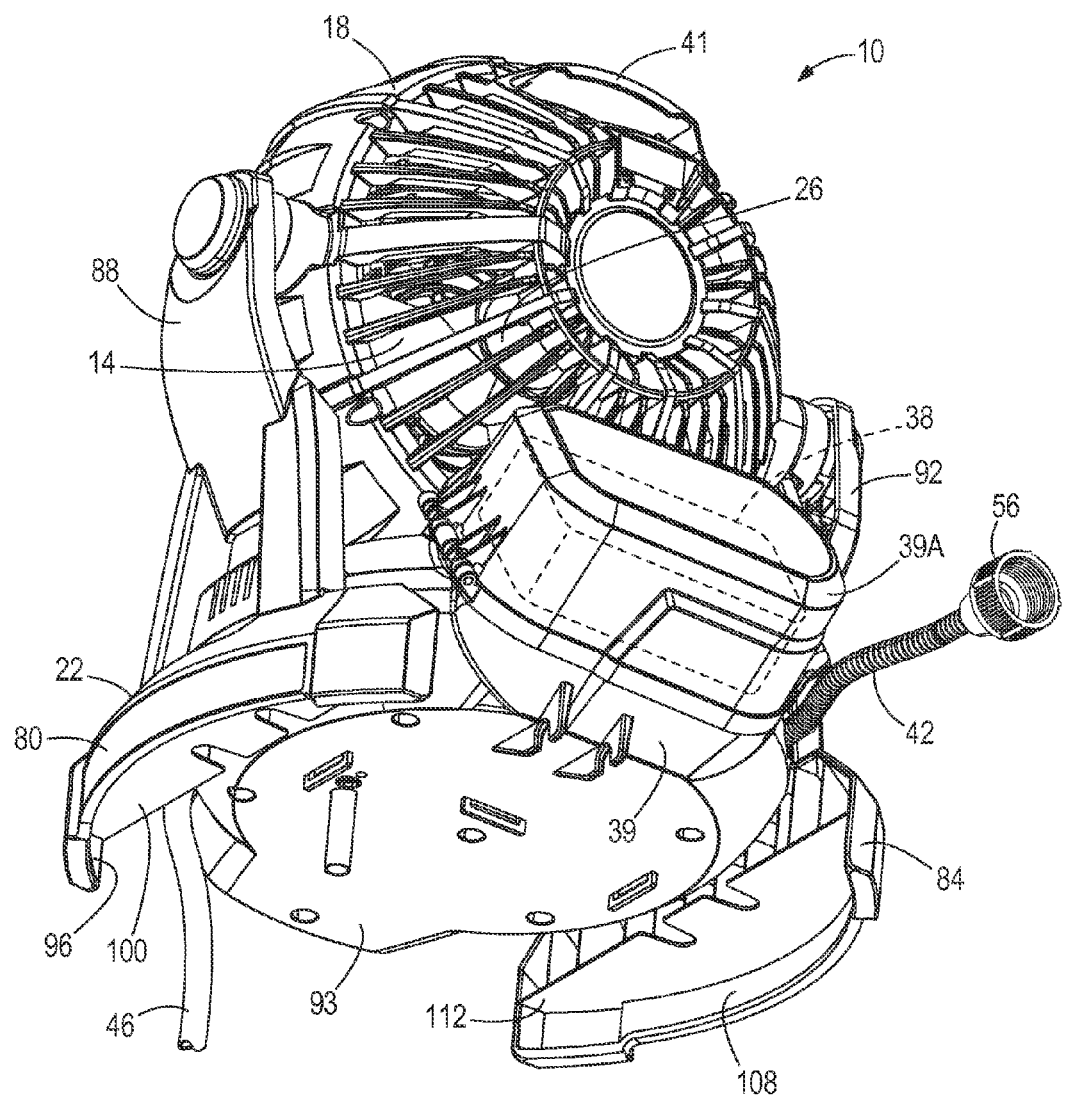
FIG. 4 is a bottom, rear perspective view of the mister fan.

The illustrated mister fan 10 includes a blade assembly 14, a shroud 18, a liquid distribution system 20, a base 22, and a motor 26. The blade assembly 14 is supported by the base 22 and connected to and driven by the motor 26 (FIG. 4). As shown in FIG. 2, the blade assembly 14 includes three blades 30 that are rotated by the motor 26 about a central axis 28 to produce a stream of accelerated air. In other embodiments, the blade assembly 14 may include fewer or more blades.

As shown in FIG. 4, the motor 26 is supported by the base 22 generally behind the blade assembly 14. The illustrated motor 26 includes a motor shaft that is coupled to the blade assembly 14 and is coaxial with the axis 28. The motor 26 receives power from a power source 38 to operate. In the illustrated embodiment, the power source 38 is a battery or a battery pack that is electrically coupled to the motor 26 to power the motor 26. The battery pack 38 is releasably coupled to and supported by the base 22. In the illustrated embodiment, the battery pack 38 is received in a battery receptacle 39 extending from a rearward portion of the base 22. The battery receptacle 39 includes a lid 39A that is openable (e.g., pivotable) to insert and/or remove the battery pack 38. The battery receptacle 39 protects the battery pack 38 from dirt, water, and/or other debris. In other embodiments, the power source 38 may include an AC wall outlet that provides AC power to the mister fan 10 via a cord. In either embodiment, the mister fan 10 may also include appropriate circuitry (e.g., voltage regulator, AC-to-DC converter, DC-to-DC converter, and the like) to control the electrical functions of the mister fan 10, such as, for example, the operating speed of the motor 26. Rotation of the motor 26 (and, thus, the rotation of the blade assembly 14) generates a stream of air that redistributes the air in the immediate environment to provide a cooling effect for a user.

As shown in FIGS. 1 and 4, the shroud 18 provides a protective cover for the blades 30 and the motor 26. In the illustrated embodiment, the shroud 18 is made of a plastic material and surrounds both the blade assembly 14 and the motor 26. In other embodiments, the shroud 18 may be made of other suitable materials. The illustrated shroud 18 includes a front shroud portion 40 and a rear shroud portion 41. The front shroud portion 40 and the rear shroud portion 41 are attached together with threaded fasteners (e.g., screws) such that at least the front shroud portion 40 is removable from the mister fan 10 (as shown in FIG. 2) to, for example, allow cleaning of the blades 30. In other embodiments, the shroud 18 may additionally or alternatively include latches, bolts, and/or other connecting mechanisms that allow the shroud portions 40, 41 to be removable from the mister fan 10. In further embodiments, the shroud portions 40, 41 may not be easily removable from the mister fan 10.

Figure 3:
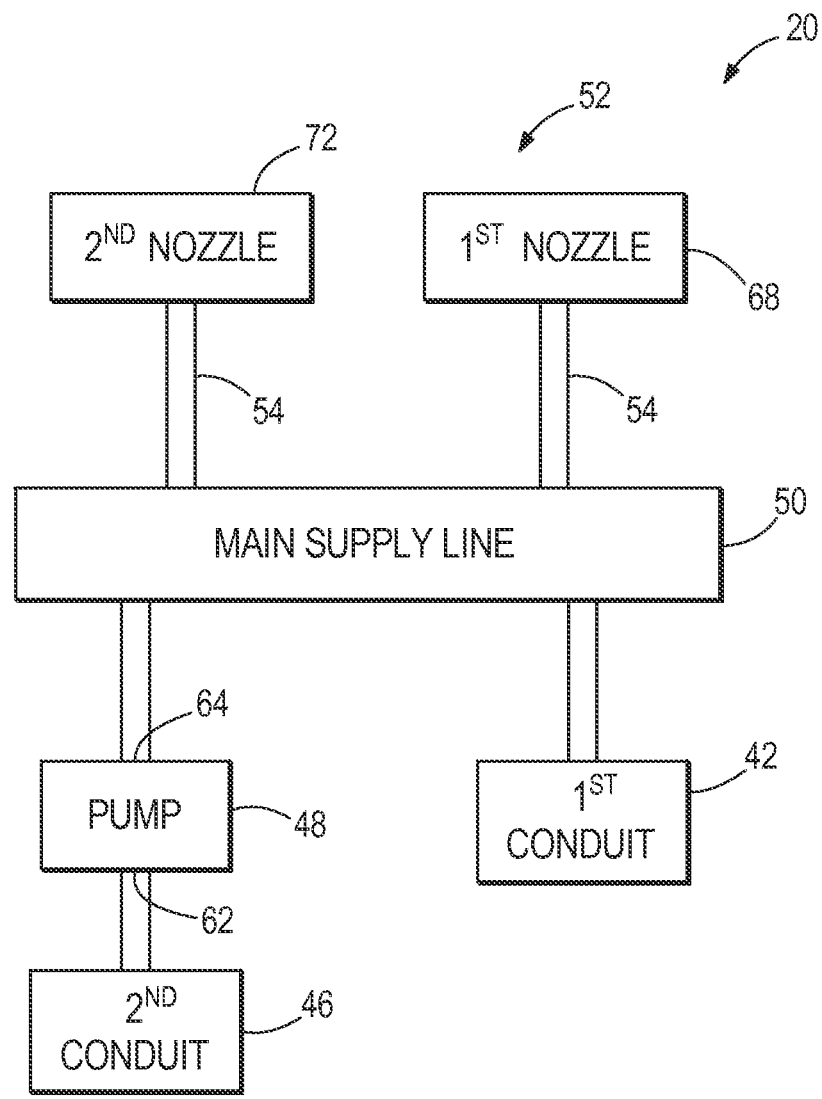
FIG. 3 is a block diagram of a liquid distribution system of the mister fan.

As shown in FIG. 3, the liquid distribution system 20 includes a first conduit 42 configured to receive liquid from a first fluid source (e.g., a pressurized fluid source), a second conduit 46 configured to receive liquid from a second fluid source (e.g., a fluid reservoir), a pump 48, a main fluid supply line 50 positioned within the base 22, a spray nozzle unit 52, and auxiliary conduits 54 connecting the main fluid supply line 50 to the nozzle unit 52. As further discussed below, the first fluid source and the second fluid source are different types of fluid sources. In the illustrated embodiment, the liquid distribution system 20 is supported by the base 22.

The first conduit 42 extends outwardly from the base 22 and includes a distal end and a proximal end. The distal end of the first conduit 42 includes a connector 56 (FIG. 4) that is compatible with a hose outlet. The connector 56 is configured to threadably engage the hose outlet (i.e., the pressurized fluid source) to receive liquid from the hose outlet. The proximal end of the first conduit 42 directly connects to the main fluid supply line 50. The main fluid supply line 50, or manifold, directs the liquid received from the first conduit 42 toward the nozzle unit 52 through the auxiliary conduits 54. Once the liquid reaches the nozzle unit 52, the liquid is delivered or sprayed by the nozzle unit 52 into the stream of cooling air generated by the blade assembly 14. The stream of air helps distribute (e.g., mist) the sprayed liquid such that the immediate environment is cooled down.

Similar to the first conduit 42, the second conduit 46 extends outwardly from the base 22 and includes a distal end and a proximal end. The distal end of the second conduit 46 includes a filter assembly 60. The filter assembly 60 is submersible in liquid to draw the liquid into the second conduit 46. For example, the filter assembly 60 can be submersed in a fluid reservoir containing a supply of liquid (e.g., water). In order to extract liquid from the fluid reservoir, the proximal end of the second conduit 46 is connected to the pump 48 at a pump inlet 62. The pump 48 also includes a pump outlet 64 that is coupled to the main fluid supply line 50. In operation, the pump 48 draws the liquid from the fluid reservoir through the second conduit 46 and generates enough force to propel the liquid toward the main fluid supply line 50 and, ultimately, the nozzle unit 52. Similar to the motor 26, the pump 48 is selectively energized by the power source 38. The auxiliary conduits 54 assist in delivering the received liquid from the main fluid supply line 50 toward the nozzle unit 52 so the nozzle unit 52 may deliver or spray the liquid toward the stream of air generated by the blade assembly 14. As such, the main fluid supply line 50 is in fluid communication with the first conduit 42, the second conduit 46, and the spray nozzle unit 52 to selectively receive liquid from the first conduit 42 and the second conduit 46, depending on whether the mister fan 10 is connected to a pressurized fluid source or a fluid reservoir, and to provide the liquid received from one of the first conduit 42 and the second conduit 46 to the spray nozzle unit 52.

Based on the environment in which the mister fan 10 is used (e.g., if there is a pressurized fluid source readily available), the main fluid supply line 50 may only receive liquid through either the first conduit 42 or the second conduit 46. The main fluid supply line 50 then distributes the received liquid, from either the first conduit 42 or the second conduit 46, to the nozzle unit 52 for distribution (e.g., misting) of the liquid. Thus, the nozzle unit 52 is in fluid communication with both the first conduit 42 and the second conduit 46, but selectively receives liquid from only one of the first conduit 42 and the second conduit 46 at a time.

As shown in FIGS. 1 and 2, the illustrated spray nozzle unit 52 includes a first spray nozzle 68 and a second spray nozzle 72. The first nozzle 68 and the second nozzle 72 are positioned adjacent the blade assembly 14 such that the liquid expelled through the first nozzle 68 and the second nozzle 72 is generally evenly distributed. For example, in the illustrated embodiment, the second nozzle 72 is spaced apart from the first nozzle 68 such that the first nozzle 68 and the second nozzle 72 are positioned on diametrically opposed sides of the blade assembly 14. Furthermore, the first nozzle 68 and the second nozzle 72 are tilted toward the central axis 28 about which the blade assembly 14 rotates such that the nozzles 68, 72 face inward toward the center of the blade assembly 14. In this position, when the first nozzle 68 and the second nozzle 72 expel liquid, the liquid is sprayed directly into the stream of air generated by the blade assembly 14. In some embodiments, the direction in which the first nozzle 68 and the second nozzle 72 are facing (e.g., toward the center of the blade assembly 14) may be adjustable by a user. In such embodiments, the first nozzle 68 and the second nozzle 72 may be rotatable or movable such that the angle and/or direction of the first nozzle 68 and the second nozzle 72 may be changed.

The base 22 supports the blade assembly 14, the shroud 18, and the liquid distribution system 20. Since the mister fan 10 is configured to alternately receive liquid from a pressurized fluid source (e.g., a water hose) and from a fluid reservoir (e.g., a bucket), the base 22 is configured to stand independently when the mister fan 10 receives water from a pressurized fluid source, and to couple to and be supported by the fluid reservoir when the mister fan 10 receives liquid from the fluid reservoir. The illustrated base 22 includes a first supporting section 80, a second supporting section 84, a first supporting arm 88, a second supporting arm 92, and a cover section 93. The cover section 93 substantially covers the liquid distribution system 20, the pump 48, and any controls or circuitry associated with the operation of the mister fan 10. The cover section 93 helps keep the internal components of the mister fan 10 relatively free of dirt, water, and other contaminants. In the illustrated embodiment, the base 22 also includes two actuators 94A, 94B supported by the cover section 93. The actuators 94A, 94B, or control buttons, allow a user to change settings of the mister fan 10. For example, the actuators 94A, 94B may be operable to turn the motor 26 on and off, turn the pump 48 on and off, control the speed of the blade assembly 14, open and close the spray nozzle unit 52, or a combination of these and other features.

As shown in FIG. 2, the first and second supporting arms 88, 92 are spaced apart from each other and positioned on opposite sides of the shroud 18. The first supporting arm 88 and the second supporting arm 92 extend generally perpendicularly from the cover section 93 of the base 22 and are pivotally coupled to the shroud 18 to support the shroud 18 and the blade assembly 14. In the illustrated embodiment, the first spray nozzle 68 is disposed on the first supporting arm 88, and the second spray nozzle 72 is disposed on the second supporting arm 92. In other embodiments, the first supporting arm 88 and the second supporting arm 92 may include housings to accommodate the first nozzle 68 and the second nozzle 72, respectively. In the illustrated embodiment, the shroud 18 and the blade assembly 14 are pivotable relative to the base 22 about a generally horizontal axis 95 extending through the first and second supporting arms 88, 92. The pivot axis 95 is generally perpendicular to the central axis 28 about which the blade assembly 14 is rotatable. That is, as the blades 30 of the blade assembly 14 rotate about a first axis (e.g., the central axis 28), the blade assembly 14 is pivotable relative to the base 22 about a second axis (e.g., the pivot axis 95). The blade assembly 14, thus, may be adjusted such that the mister fan 10 directs a cooling mist at different elevations based on the position of the blade assembly 14 in the immediate environment and the cooling needs of the immediate environment.

Figure 6:
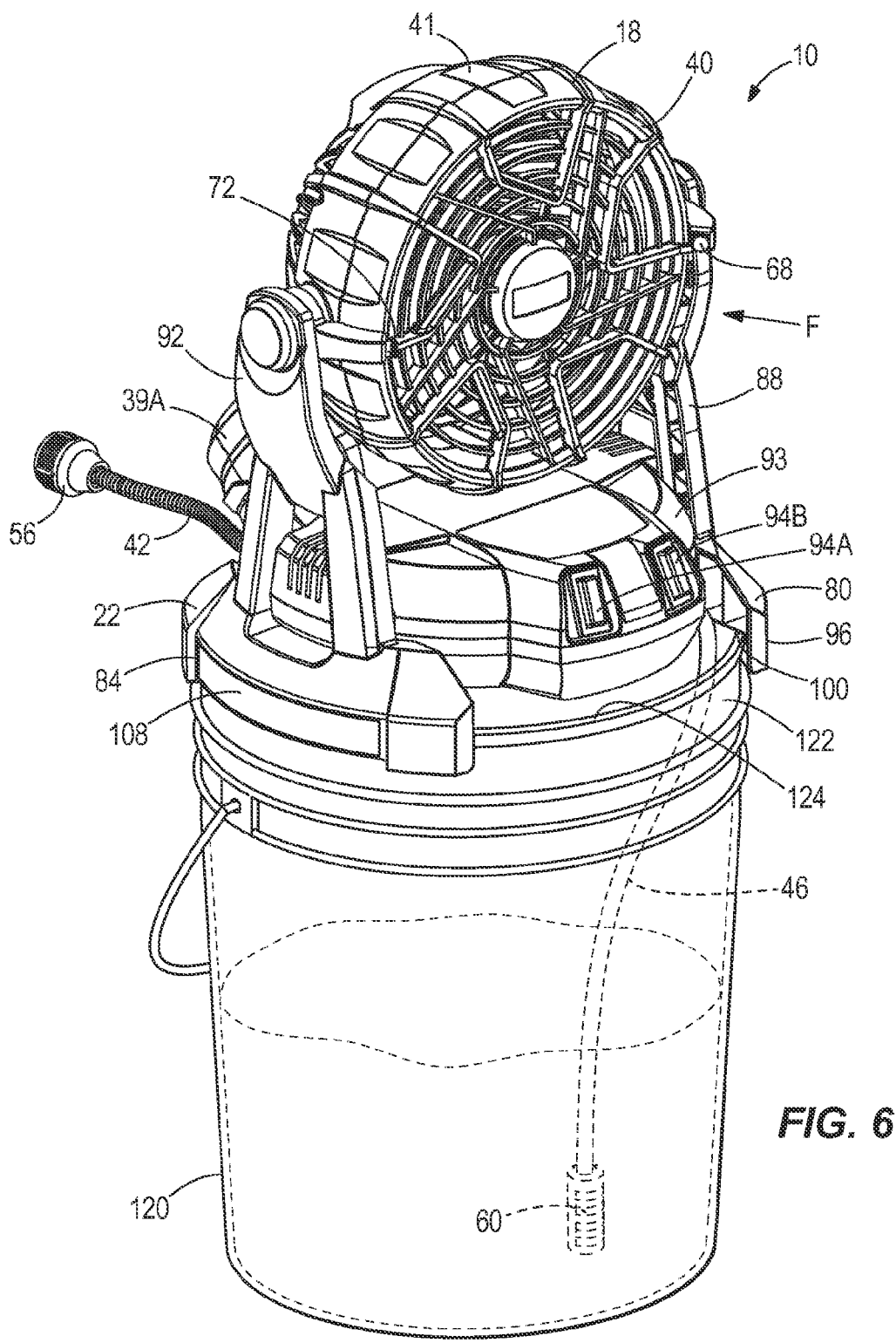
FIG. 6 is a top perspective view of a mister fan assembly including a bucket and the mister fan supported by the bucket.

As shown in FIG. 4, the first supporting section 80 and the second supporting section 84 are located at the lowest part of the mister fan 10 and support the mister fan 10 in a vertical position. The first and second supporting sections 80, 84 are spaced apart from each other and positioned on diametrically opposite sides of the base 22. The weight of the mister fan 10 is, therefore, evenly distributed between the first supporting section 80 and the second supporting section 84. In the illustrated embodiment, the first supporting section 80 includes a first horizontal portion 100 and a first flange 96 extending downwardly from the first horizontal portion 100. The first flange 96 forms a semi-circular profile and is adapted to abut to an outer surface or sidewall of the fluid reservoir (FIG. 6). The second supporting section 84 is structured similar to the first supporting section 80 and includes a second horizontal portion 112 and a second flange 108 extending downwardly from the second horizontal portion 112. The second flange 108 forms a semi-circular profile and is adapted to abut the outer surface or sidewall of the fluid reservoir (FIG. 6). Viewed together, the first and second supporting sections 80, 84 provide the base 22 with a generally circular footprint. In some embodiments, the base 22 has a diameter between about 8 inches and about 18 inches, defined by the flanges 96, 108, such that the base 22 is configured (i.e., shaped and sized) to fit on top of a standard bucket. In the illustrated embodiments, the base 22 has a diameter of about 12 inches.

Figure 5:
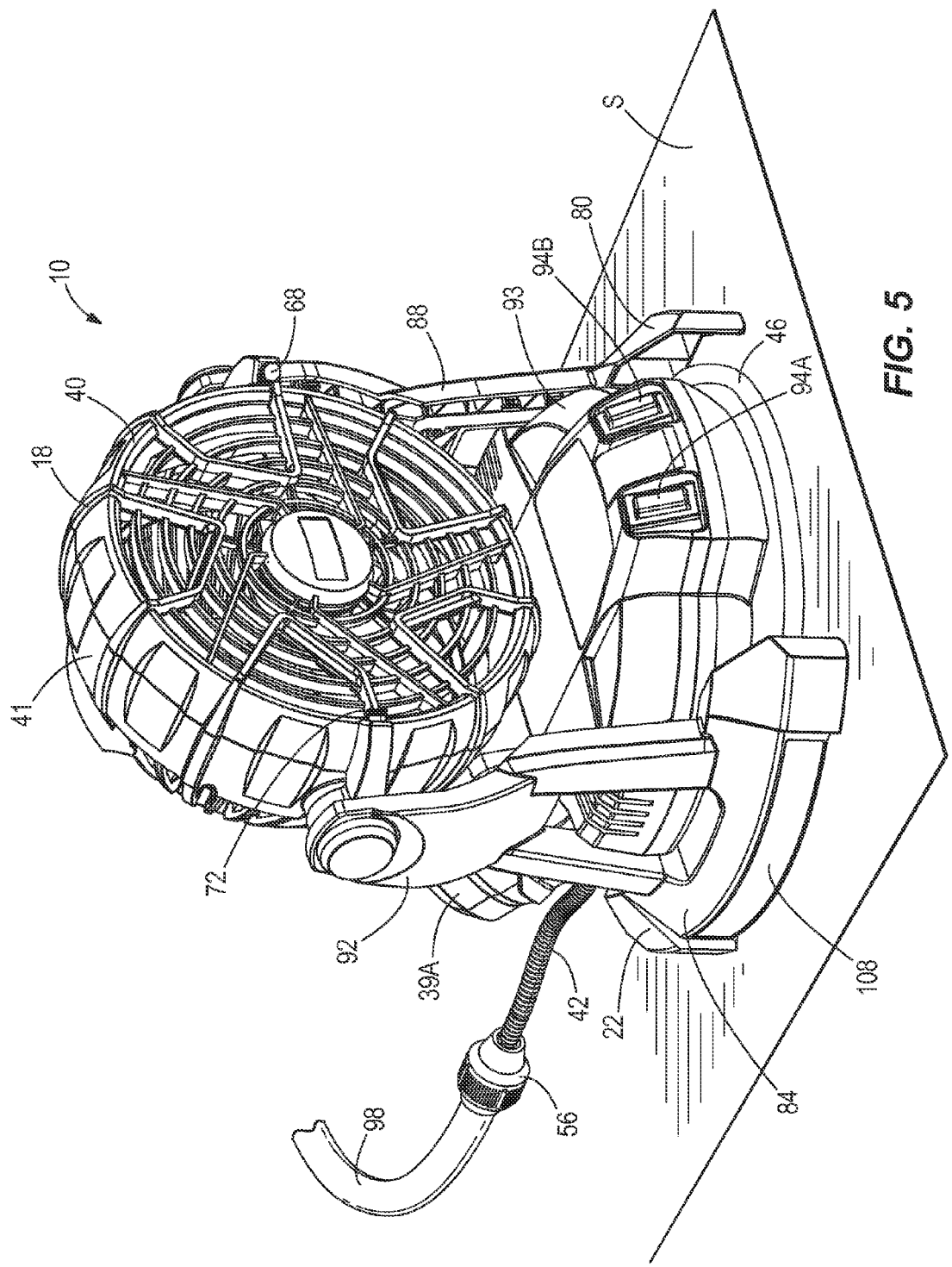
FIG. 5 is a top perspective view of the mister fan supported on a surface and connected to a pressurized fluid source.

As shown in FIG. 5, the base 22 is able to support the mister fan 10 on a surface S (e.g., the ground, a table, etc.) independently and separately from a specialized stand. Such functionality may be particularly useful when the mister fan 10 receives liquid through the first conduit 42 from a pressurized fluid source (e.g., a garden or water hose 98). When the base 22 stands independently, the first flange 100 and the second flange 108 provide sufficient support for the base 22 to support the blade assembly 14, the liquid distribution system 20, and the shroud 18 apart from the ground (or other surface). Since the first supporting section 80 and the second supporting section 84 are positioned diametrically opposed to each other, the weight of the mister fan 10 is evenly distributed between the first flange 100 and the second flange 108. Thus, the base 22 is able to stand independently and in a stable position while the liquid distribution system 20 receives liquid from the pressurized fluid source.

As shown in FIG. 6, the base 22 is also able to couple to and be supported by, for example, a bucket 120. The bucket 120 includes a sidewall 122 having an upper edge 124. The sidewall 122 includes an inner surface and an outer surface. The inner surface of the sidewall 122 defines a fluid reservoir with which the second conduit 46 of the mister fan 10 can communicate to receive liquid. The outer surface of the sidewall 122, as well as the upper edge 124, physically couple to the base 22 to help support the mister fan 10 on top of the bucket 120. In the illustrated embodiment, the bucket 120 is a five gallon bucket having a diameter of approximately 12 inches. In other embodiments, the bucket 120 may have other volumes and/or diameters. When the base 22 is coupled to the bucket 120, the liquid distribution system 20 receives liquid from the bucket 120 through the second conduit 46. In addition, the first flange 96 and the second flange 108 abut and extend over portions of the outer surface of the sidewall 122, while the first horizontal portion 100 and the second horizontal portion 112 rest on top of the upper edge 124 of the bucket 120. The first horizontal portion 100 and the second horizontal portion 112 provide support for the blade assembly 14, the liquid distribution system 20, and the shroud 18, while the first flange 96 and the second flange 108 inhibit lateral movement of the mister fan 10 relative to the bucket 120. In other words, if a force F is exerted on the mister fan 10 while the base 22 is supported by the bucket 120, the first and second flanges 96, 108 inhibit the mister fan 10 from being knocked over and off of the bucket 120.

Although the invention has been described with reference to certain preferred embodiments, variations and modifications exist within the scope and spirit of one or more independent aspects of the invention. Various features and advantages of the invention are set forth in the following claims.

What is claimed is:

1. A mister fan comprising:
   a base;
   a motor supported by the base;
   a blade assembly supported by the base and driven by the motor;
   a first conduit extending from the base and configured to receive liquid from a first fluid source;
   a second conduit extending from the base and configured to receive liquid from a second fluid source that is different than the first fluid source; and
   a spray nozzle unit supported by the base adjacent the blade assembly, the spray nozzle unit in fluid communication with the first conduit and the second conduit to selectively receive liquid from the first and second conduits.

2. The mister fan of claim 1, further comprising a pump supported by the base, wherein at least one of the first conduit and the second conduit is coupled to the pump.

3. The mister fan of claim 2, further comprising a fluid supply line positioned within the base and in fluid communication with the first conduit, the second conduit, and the spray nozzle unit, wherein the fluid supply line is configured to provide liquid received from the first conduit and the second conduit to the spray nozzle unit.

4. The mister fan of claim 3, wherein the first conduit is directly coupled to the fluid supply line, and wherein the second conduit is coupled to the fluid supply line through the pump.

5. The mister fan of claim 1, wherein the spray nozzle unit includes a first spray nozzle and a second spray nozzle that is spaced apart from the first spray nozzle.

6. The mister fan of claim 5, wherein the first spray nozzle and the second spray nozzle are positioned on diametrically opposed sides of the blade assembly.

7. The mister fan of claim 1, wherein the base includes a supporting arm, and further comprising a shroud coupled to the supporting arm, wherein the shroud substantially surrounds the blade assembly.

8. The mister fan of claim 7, wherein the blade assembly is driven by the motor to rotate about a first axis, and wherein the blade assembly and the shroud are pivotable relative to the base about a second axis that is generally perpendicular to the first axis.

9. The mister fan of claim 1, wherein the base has a generally circular footprint.

10. The mister fan of claim 8, wherein the base has a diameter between about 8 inches and about 18 inches.

11. The mister fan of claim 1, wherein the first conduit is configured to receive liquid from a pressurized fluid source, and wherein the second conduit is configured to receive liquid from a fluid reservoir.

12. The mister fan of claim 11, wherein the fluid reservoir is defined by a bucket, and wherein the base is configured to support the mister fan on the bucket.

13. The mister fan of claim 12, wherein the base includes a generally horizontal portion and a flange extending downwardly from the horizontal portion, wherein the horizontal portion is configured to rest on top of the bucket, and wherein the flange is configured to extend over a portion of an outer surface of the bucket.

14. The mister fan of claim 1, further comprising a battery pack supported by the base, wherein the battery pack is electrically coupled to the motor to power the motor.

15. A mister fan assembly comprising:
a bucket including a sidewall having an upper edge, the bucket defining a fluid reservoir; and
a mister fan including
a base coupled to the upper edge of the bucket to support the mister fan generally on top of the bucket,
a pump supported by the base,
a motor supported by the base,
a blade assembly supported by the base and driven by the motor,
a first conduit extending from the base and configured to receive liquid from a pressurized fluid source,
a second conduit extending from the base and into the bucket to receive liquid from the fluid reservoir, and
a spray nozzle unit supported by the base adjacent the blade assembly, the spray nozzle unit in fluid communication with the first conduit and the second conduit to selectively receive liquid from the first and second conduits.

16. The mister fan assembly of claim 15, wherein the base of the mister fan has a generally circular footprint.

17. The mister fan assembly of claim 15, wherein the base includes two spaced apart supporting sections, wherein each supporting section includes a horizontal portion and a flange extending downwardly from the horizontal portion, wherein each horizontal portion rests on the upper edge of the bucket, and wherein each flange extends over a portion of an outer surface of the sidewall of the bucket.

18. The mister fan assembly of claim 17, wherein the two spaced apart supporting sections are positioned on diametrically opposed sides of the bucket.

19. The mister fan assembly of claim 15, wherein the mister fan further includes a fluid supply line positioned within the base and in fluid communication with the first conduit, the second conduit, and the spray nozzle unit, and wherein the fluid supply line is configured to provide liquid received from the first conduit and the second conduit to the nozzle unit.

20. The mister fan assembly of claim 19, wherein the first conduit is directly coupled to the fluid supply line, and wherein the second conduit is coupled to the fluid supply line through the pump.

21. The mister fan assembly of claim 15, wherein the spray nozzle unit includes a first spray nozzle and a second spray nozzle that is spaced apart from the first spray nozzle.

22. The mister fan assembly of claim 15, wherein the base includes a supporting arm, wherein the mister fan further includes a shroud coupled to the supporting arm, and wherein the shroud substantially surrounds the blade assembly.

23. The mister fan assembly of claim 22, wherein the blade assembly is driven by the motor to rotate about a first axis, and wherein the blade assembly and the shroud are pivotable relative to the base about a second axis that is generally perpendicular to the first axis.

24. The mister fan assembly of claim 15, wherein the mister fan further includes a battery pack supported by the base, and wherein the battery pack is electrically coupled to the motor to power to the motor.

* * * * *